Nov. 5, 1946. P. H. JOHNSON 2,410,739
TRACKLAYING VEHICLE
Filed Sept. 18, 1943
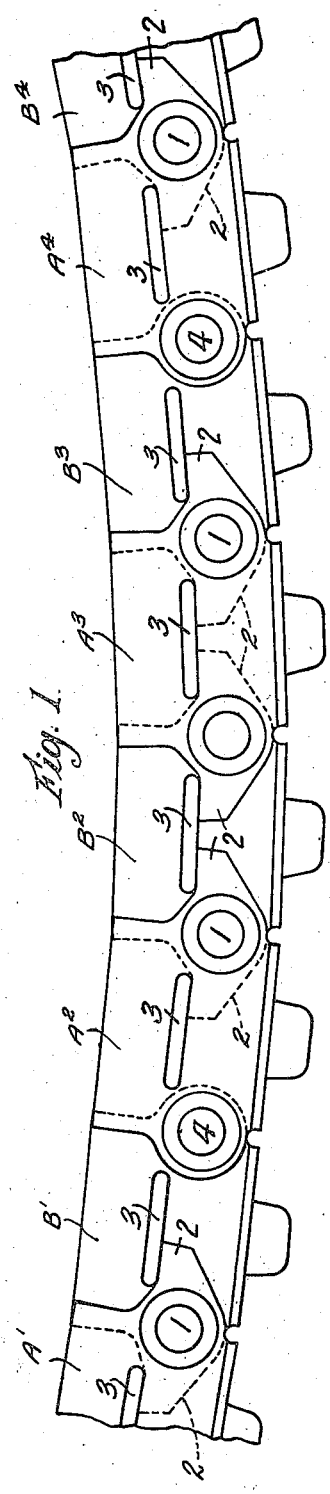
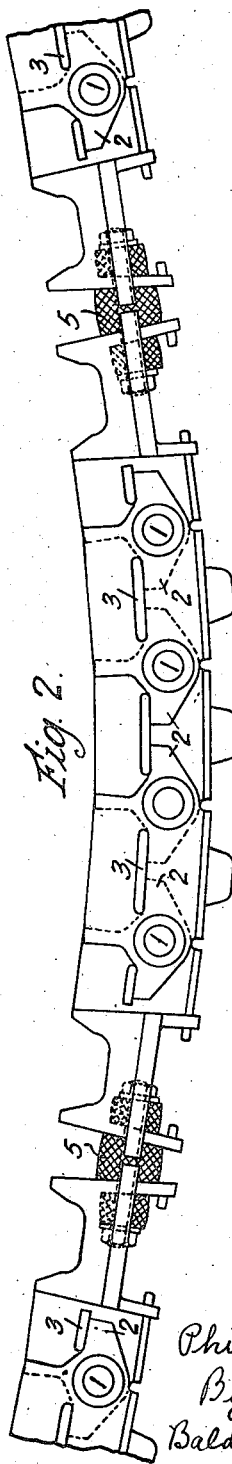

Patented Nov. 5, 1946

2,410,739

UNITED STATES PATENT OFFICE 2,410,739

TRACKLAYING VEHICLE

Philip Henry Johnson, Hounslow, England, assignor to Roadless Traction Limited, Hounslow, England Application September 18, 1943, Serial No. 502,983
In Great Britain August 25, 1942

2 Claims. (Cl. 305—10)

This invention relates to improvements in tracklaying vehicles and it particularly concerns a modification of the locked girder type of track.

The outstanding characteristic of the locked girder track is that it is flexible in only one direction as distinct from the conventional type of construction, when the links are joined together in a manner which gives them flexibility in two directions. In other words, the locked girder track while capable of flexibility enabling it to be wrapped round rollers, wheels or sprockets by normal curvature is incapable of reverse curvature in contact with the ground. For many applications this type of construction has great advantages, but for vehicles having a long length of track contact with the ground and which are required to run at comparatively high speeds the construction may suffer from the disadvantage that as the track is incapable of reverse curvature it cannot "absorb" obstacles but must rise bodily over them or crush them into the ground. The whole track unit can of course be sprung in relationship to the rest of the vehicle if so desired, as in fact it is in some cases for the purpose of equalising the loads on the rollers, wheels and/or sprockets around which the track may be entrained, but this has only a very limited effect as regards "absorbing" obstacles.

The object of the present invention is to provide for a more substantial "absorption" of obstacles into the locked girder track, thus facilitating high speed work over rough country.

This object is effected, according to the invention, by introducing into the locked girder type of track, whether for a self-propelled vehicle or otherwise, a number of joints which are flexible in both directions and permit of reverse curvature.

A flexible joint may be introduced "occasionally" leaving one or more locked joints intermediate between successive flexible joints, or two or more flexible joints in succession may be introduced at intervals. The flexible joints may be of the rubber jointed type or of the pin jointed type, or of any known variety. The so-called "flexible joints" may be also limited as regards the degree of reverse curvature provided for.

A flexible joint may be produced by employing a construction of link as employed in the locked girder type of track but eliminating the normal interlocking abutments, single or double, or modifying them so as to permit of limited or, practically speaking, unlimited reverse curvature. It will, of course, be understood that the construction may require in certain cases to be further modified so as to provide additional clearance in other parts which might otherwise interfere with the obtaining of the desired extent of reverse curvature.

The present invention may be used in the track construction of tracklaying vehicles described in the copending application of Philip Henry Johnson et al., Serial No. 483,306, filed April 16, 1943.

The invention is illustrated by way of example in the accompanying drawing, in which:

Figure 1 is a side elevation of a length of track of the locked girder type including one form of flexible joint;

Figure 2 is similar to Figure 1 but including a different form of flexible joint.

Referring to the drawing, the numeral 1 indicates pin joints between adjacent links which in the position shown are locked against flexing in one direction by reason of projections 2 on one link engaging abutments 3 on the adjacent link. The pin joints 4 (Figure 1) however, are flexible joints since the projections 2 are eliminated from the links concerned and therefore there is no engagement with the abutments 3 to lock the links against flexing in either direction. Accordingly, whereas the other pairs of links are incapable of reverse curvature, the pair of links connected by the joint 4 is capable of reverse curvature.

More particularly considered, the partial section of track shown in Figure 1 comprises a set of connected links $A^1$, $B^1$, $A^2$, $B^2$, $A^3$, $B^3$, $A^4$, and $B^4$. The adjacent links of the pair of links $A^3$, $B^3$, are connected by a hinge pin 1 which permits the links $A^3$ and $B^3$ to hinge or swing in the normal angular relationship which they will assume in passing around a wheel or sprocket. However, the links $A^3$ and $B^3$ cannot swing into the reverse angular relationship because of the engagement of the unyielding abutments 2 and 3. Similarly the pairs $A^1$, $B^1$; $A^2$, $B^2$; $B^2$, $A^3$; and $A^4$, $B^4$ can swing about the associated pins 1 into normal angular relationship but are prevented by the unyielding abutments 2 and 3 from swinging into reverse angular relationship.

However, the pairs $B^1$, $A^2$ and $B^3$, $A^4$ are freely swingable about the pivot pins 4 in both directions, that is, into reverse angular relationship as well as into normal angular relationship, this being so because there are no mutually engaging unyielding abutments associated with these particular pairs.

In the length of track shown in Figure 2, there are two flexible joints 5 whilst the others are locked joints as in Figure 1. The flexible joints 5 are made of rubber, or rubber-like material, thus permitting the links joined thereby to flex equally in either direction.

The complete tracks, of which only a short length is shown in the drawing, will be understood as continuing with the same alternation of locked and flexible joints as in the lengths shown. Of course, the particular alternation may be varied as has already been indicated but it will be regular throughout the length of a track.

What I claim is:

1. For track laying vehicles, a track comprising a plurality of links; means connecting certain pairs of adjacent links for enabling said so connected links to swing relatively to each other into the normal angular relationship; mutually engaging unyielding abutments, on said so connected links only, for preventing any such pair from swinging relatively to each other into reverse angular relationship; and means connecting other pairs of links to swing relatively to each other into both normal and reverse angular relationship, said other pairs of links being spaced at regular intervals throughout the length of the track.

2. For track laying vehicles, a track comprising a plurality of links; means pivotally connecting certain pairs of adjacent links for enabling said so connected links to hinge into the normal angular relationship; mutually engaging unyielding abutments, on said so connected links only, for preventing any such pair from hinging into reverse angular relationship; and means comprising flexible rubber elements connecting other pairs of links to hinge into both normal and reverse angular relationship.

PHILIP HENRY JOHNSON.